Nov. 24, 1970    L. W. LANGLEY    3,541,779
ELECTRONIC TIMEPIECE

Original Filed March 19, 1968    3 Sheets-Sheet 1

INVENTOR
LAWRENCE W. LANGLEY

BY *Charles W. Gregg*

AGENT

Nov. 24, 1970     L. W. LANGLEY     3,541,779
ELECTRONIC TIMEPIECE

Original Filed March 19, 1968     3 Sheets-Sheet 2

INVENTOR
LAWRENCE W. LANGLEY

BY *Charles W. Gregg*

AGENT

Nov. 24, 1970    L. W. LANGLEY    3,541,779
ELECTRONIC TIMEPIECE
Original Filed March 19, 1968    3 Sheets-Sheet 3
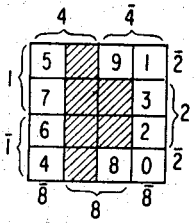
FIG.6M
FIG.6
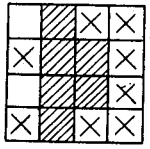
FIG.6A
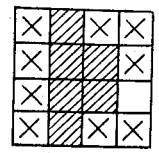
FIG.6B
FIG.6C
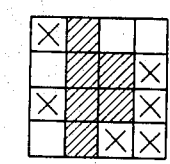
FIG.6D
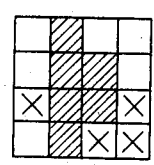
FIG.6E
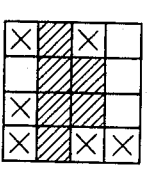
FIG.6F
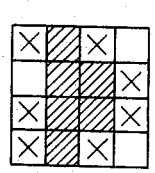
FIG.6G
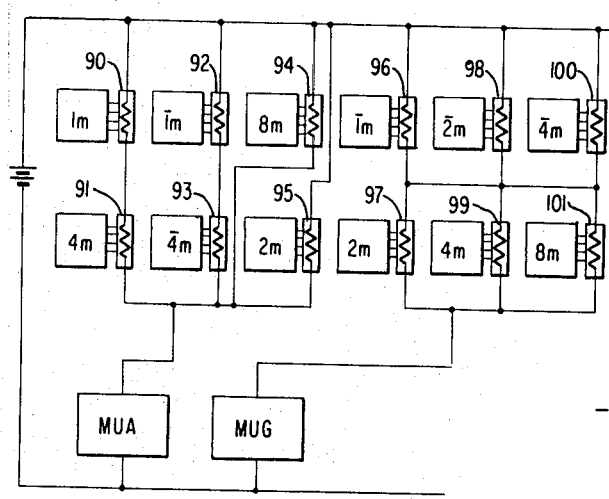
FIG.7
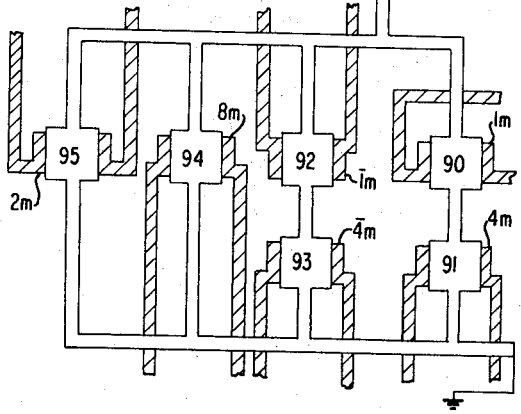
FIG.8
FIG.9
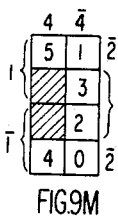
FIG.9M
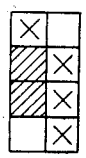
FIG.9A
FIG.9B
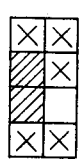
FIG.9C
FIG.9D
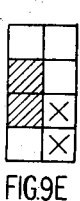
FIG.9E
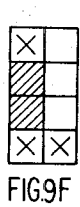
FIG.9F
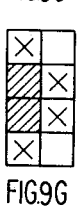
FIG.9G
INVENTOR
LAWRENCE W. LANGLEY
BY *Charles W. Gregg*
AGENT

United States Patent Office 3,541,779
Patented Nov. 24, 1970

3,541,779
ELECTRONIC TIMEPIECE
Lawrence W. Langley, Corning, N.Y., assignor to Corning Glass Works, Corning, N.Y., a corporation of New York
Original appplication Mar. 19, 1968, Ser. No. 714,278, now Patent No. 3,485,033, dated Dec. 23, 1969. Divided and this application Aug. 19, 1969, Ser. No. 862,138
Int. Cl. G04b *19/30*
U.S. Cl. 58—50                2 Claims

ABSTRACT OF THE DISCLOSURE

An electronic timepiece for providing a visual indication of the time. A highly stable frequency source provides pulses which are divided by frequency dividing means to provide one pulse per minute. Counter chains with light-emitting diodes in their outputs, indicate, in binary form, the time in tens and units of minutes and hours. Photosensitive elements responsive to the light emitting diodes are used to control a display array to provide the visual indication of the time. The entire device is hermetically sealed, and means is provided to control the frequency dividing means from outside the hermetic seal to set the timepiece to the correct time.

This is a division of my copending application Ser. No. 714,278 filed Mar. 19, 1968, which is now Pat. No. 3,-485,033.

BACKGROUND OF THE INVENTION

This invention relates to an electronic timepiece which can be constructed in microelectronic form and having an electroluminescent digital display.

Prior devices in this field have provided electroluminescent display. However, this invention provides a digital display coupled by optical logic circuits to the timekeeping mechanism. This invention also provides a novel means for setting the time of a hermetically sealed microelectronic timepiece without breaking the seal. The invention is also adapted for use with thin film circuits.

BRIEF DESCRIPTION OF THE DRAWINGS

FIGS. 6A through 6G and 6M are Veitch diagrams used for display logic for minutes and hours.

FIG. 7 illustrates examples of display logic mechanization derived from FIG. 6.

FIG. 8 illustrates a solid-state embodiment of the coding for display element MUA as derived from FIG. 7.

FIGS. 9A through 9G and 9M are Veitch diagrams used for display logic for tens of minutes.

FIG. 1 shows the timing elements of the timepiece. A Hartley-type oscillator 102, controlled by a piezoelectric crystal 101, generates a signal having a very stable frequency $f$. Frequency dividers 103 and 104, in series, divide the frequency $f$ by a predetermined constant to produce an output signal from divider 104 to OR gate 108 of one pulse per minute. In their simplest form dividers 103 and 104 may be chains of flip-flop circuits, although components which divide by a number other than two are available and useable in the divider circuits.

The OR gate 108 produces an output signal A, normally one pulse per minute. The means to vary the frequency of signal A is discussed later.

Figure 2:
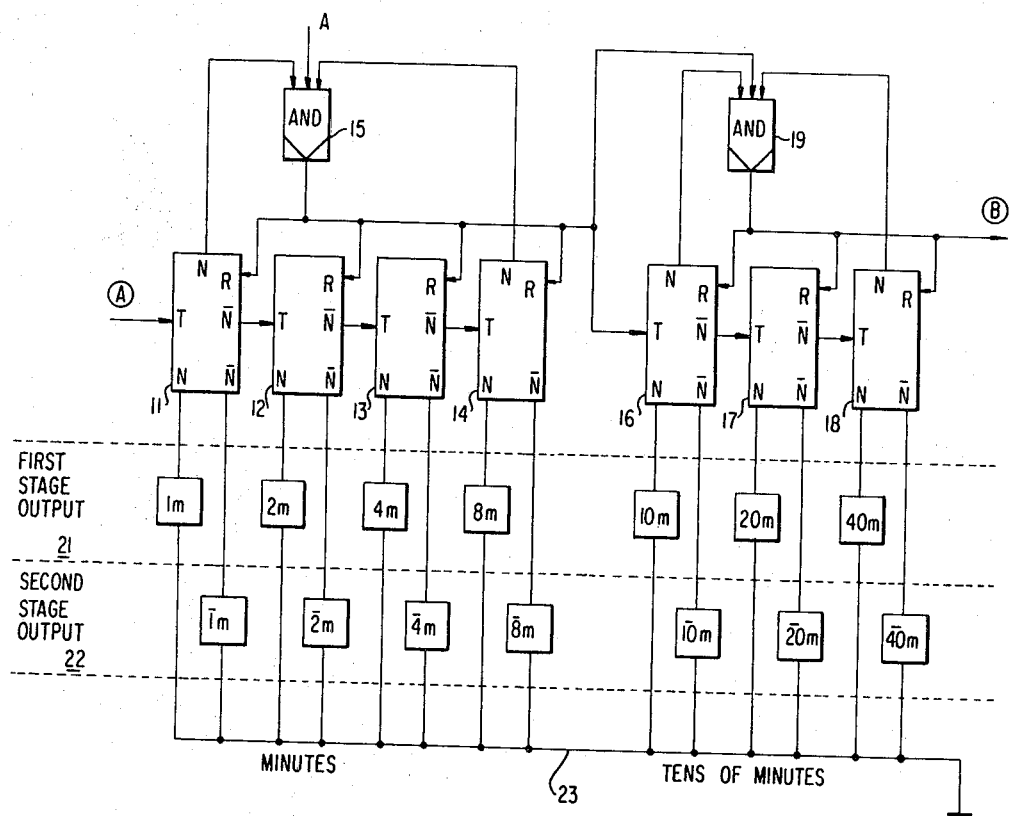
FIG. 2 is an illustration of the timing circuit for producing binary indications of the minutes and tens of minutes.

Signal A is applied to the trigger input $t$ of flip-flop 11 in FIG. 2. Flip-flops 11–14 are arranged as a chain of 16 counter, with the signals N from the first stages of flip-flops 11 and 14 applied to the input of AND gate 15 along with signal A. Coincidence of the three signals at AND gate 15 produces an output signal which is applied to the reset terminals R of flip-flops 11–14 and to the trigger input terminal T of flip-flop 16. AND gate 15 is activated only when the chain of 16 counter (11–14) indicates a minute count of 9 (8 and 1) and when an additional input signal A indicates that the units count should go from 9 to 0. Thus, the output signal from AND gate 15 has one pulse every ten minutes.

Each stage of each of the flip-flops 11–14, when activated, causes a current to flow through its associated light-producing element, which elements, in the preferred embodiment, are electroluminescent diodes. The diodes activated by the first stages of the flip-flops 11–14 are indicated between dotted lines as FIRST STAGE OUTPUT 21 with numbers $1m$, $2m$, $4m$, and $8m$ on the diodes indicating the weighting of the stages controlling the respective diodes. The diodes activated by the second stages of the flip-flops 11–14 are indicated between dotted lines as SECOND STAGE OUTPUT 22 with numbers $\overline{1m}$, $\overline{2m}$, $\overline{4m}$, and $\overline{8m}$ indicating weighting. Of course, only one of the two diodes associated with each flip-flop will be lighted at one time.

The signal from AND gate 15, containing 1 pulse per 10 minutes, drives a chain of 8 counter formed by flip-flops 16–18. AND gate 19 is connected to receive the signals N from the first stages of flip-flops 16 and 18 along with the output of AND gate 15. Coincidence of the three signals at AND gate 19 produces an output B which is applied to the reset terminals R of flip-flops 16–18 and to the trigger input terminal T of flip-flop 31 in FIG. 3. AND gate 19 is activated only when the chain of 8 counter (16–18) indicates a count of 5 tens (or 4 tens and 1 ten) and when an additional signal from gate 15 indicates that the tens count should go from 5 to 0. Thus, the output signal B from AND gate 19 has one pulse every hour. There is also a light-producing element associated with each stage of flip-flops 16–18.

Figure 3:
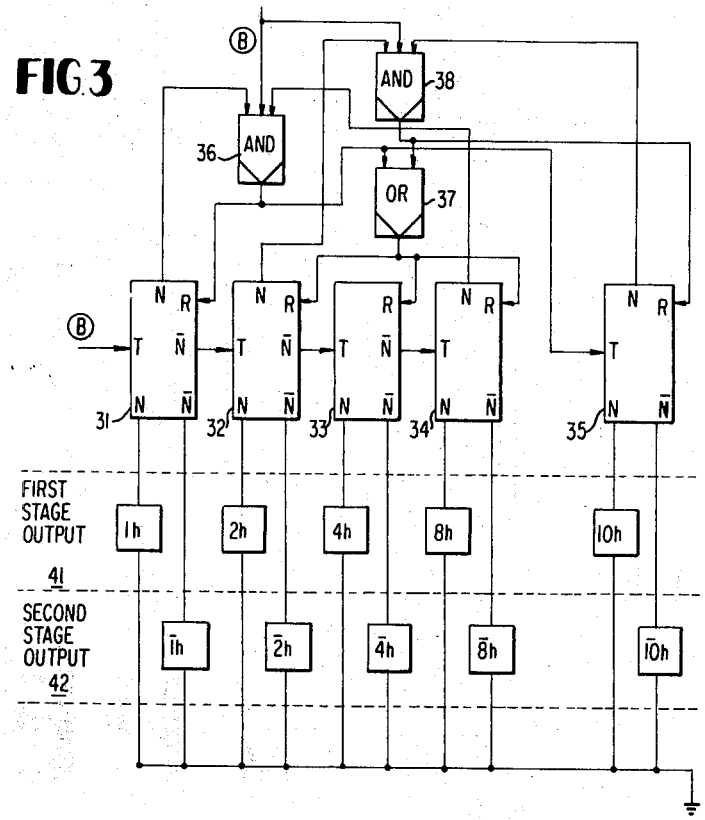
FIG. 3 is an illustration of the timing circuit for producing binary indications of the hours and tens of hours.

Signal B is applied to the trigger input T of flip-flop 31 in FIG. 3. Flip-flops 31–34 are arranged as a chain of 16 counter, with the signals N from the first stages of flip-flops 31 and 34 applied to the input of an AND gate 36 along with signal B. Coincidence of the three signals at AND gate 36 produces an output signal which is applied to the reset terminal R of flip-flop 31, to an OR gate 37, and to the trigger input terminal T of a flip-flop 35. AND gate 36 is activated only when the chain of 16 counter (31–34) indicates an hour count of 9 (or 8 and 1) and when an additonal input signal B indicates that the hour count should go from 9 to 0. The output signal from OR gate 37 is applied to the reset terminals R of flip-flops 32–34. Thus flip-flops 31–34 are arranged to be reset to zero as a pulse is applied to trigger flip-flop 35 to a one position.

Because the indicated time in the preferred embodiment changes from 12:59 to 1:00 rather than to 13:00, an additional logic arrangement is needed between the hours of 12 and 1.

With a signal from the first stage output N of flip-flop 35 applied to one input of an AND gate 38 indicating a count for tens of hours, and with a signal from the first stage of output N of flip-flop 32 applied to another input of AND gate 38 indicating a two units count of hours, AND gate 38 is conditioned to change the system from the hour count of 12 to the hour count of 1. When the next hour pulse B is applied to another input of AND gate 38, gate 38 applies a pulse through OR gate 37 to flip-flops 32–34 to reset them to zero. Gate 38 also resets flip-flop 35 directly to zero. The same hour pulse B is applied to trigger input T of flip-flop 31 to set flip-flop 31 to an hour count of 1. This concludes the necessary explanation of the timing circuit logic.

Figure 4:
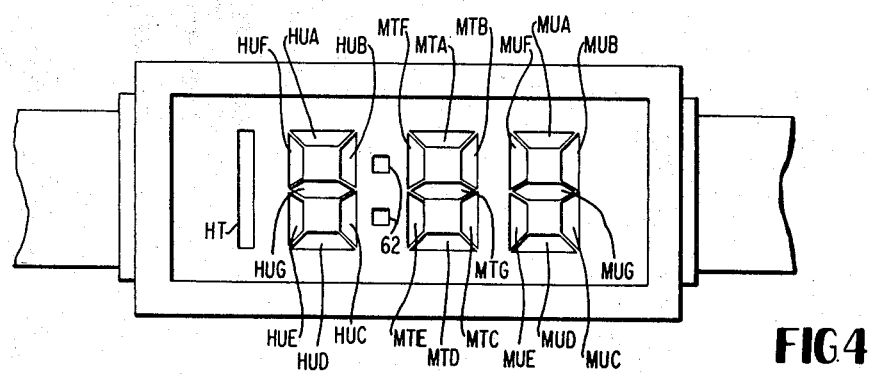
FIG. 4 is an illustration of a display useable with the present invention.

However, the indications of the timing circuit condition as given by the electroluminescent diodes in output stages 21, 22, 41 and 42 are in a binary form and would be very difficult to interpret directly when reading the timepiece to determine the time. It is desired to have the time presented on a display panel as illustrated in FIG. 4.

A display panel is illustrated having electroluminescent elements arranged to show 18:88. The discrete display elements, HT, HUA–HUG, MTA–MTG and MUA–MUG, which form the numbers in 18:88 as illustrated, are arranged to be illuminated in the necessary combination to show the corecect time. The display elements may be arranged behind a translucent sheet so that only those display elements which are illuminated will be seen. The letters used to indicate the discrete display elements are significant. The first two letters MU, MT, HU and HT respectively indicate "minutes units," "minutes tens," "hours units" and "hours tens." Because the hours tens count never shows other than 1 (nothing is shown for zero) there is only one discrete display element lettered HT and therefore no third letter is needed. In the remaining elements, the third letter indicates the position of the discrete display element in the array of elements in one numeral display position.

Figure 5B:
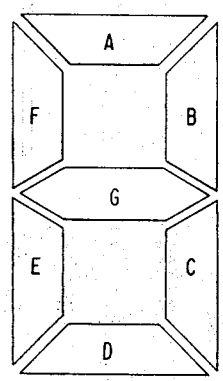
FIG. 5B is an illustration of the identifying letters A through G applied to the seven discrete display elements of a numeral array.
Figure 5A:
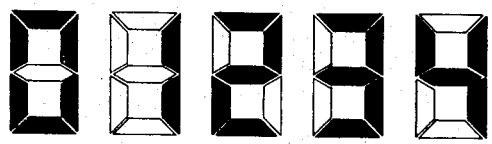
FIG. 5A is an illustration of the numerals 0 through 9 reproduced on display arrays as shown in FIG. 4.

FIG. 5A is an illustration of how the numerals 0–9 are displayed on the timepiece display. The shaded sections of the diagram indicate the lighted sections of the display.

FIG. 5B illustrates a numeral array having only the third identifying letter to identify each of the discrete display elements of the array.

Figure 5A:
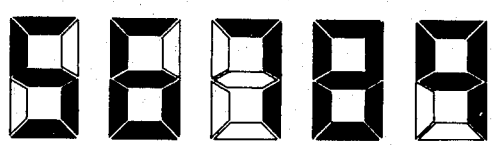

The logic necessary to operate the hours units display and the minutes units display is illustrated in the Veitch charts of FIG. 6. There are 16 possible states of a chain-of-16 counter, and 16 squares on the Veitch chart correspond to those 16 states. For example if the diodes corresponding to stages 1, 4, $\bar{8}$, and $\bar{2}$ were lighted, the corresponding square on the Veitch chart, as illustrated in FIG. 6$m$, is the upper left-hand square. Because $1+4+0\cdot8+0\cdot2=5$, the number 5 is in the upper left-hand square. The numeral 5 is produced on the display by lighting the display elements in the numeral array positions A, C, D, F and G, as can be seen from FIGS. 4 and 5. Thus, an X has been placed in the upper left-hand square of FIGS. 6A, 6C, 6D, 6F and 6G, corresponding to array positions A, C, D, F and G, to indicate that, when the timing logic produces the count of 1, 4, $\bar{2}$ and $\bar{8}$ in the MU or 5 HU positions, elements A (i.e. MUA or HUA), C, D, F, and G must be lighted. Corresponding logic is illustrated for the other positions.

Six squares are blocked out on each diagram of FIG. 6. These squares correspond to counts 10–15 which cannot occur in the chain of 16 counter with the logic illustrated to limit the count to 0–9.

From the Veitch diagrams 6A through 6G, the display equations can be derived. Only the equations for the MU display elements are presented here, but the HU equations are identical. To derive the display equations for MUA, note that in FIG. 6A, element A must be lit when 1 and 4 occur together, when $\bar{1}$ and $\bar{4}$ occur together, when 8 occurs or when 2 occurs and not otherwise. Thus, in Boolean algebra notation:

$$MUA = 14 + \bar{1}\bar{4} + 8 + 2$$

The following equations can also be derived:

$$MUB = 1\,2 + \bar{1}\,\bar{2} + \bar{4}$$
$$MUC = 1 + \bar{2} + 4$$
$$MUD = \bar{1}\,\bar{4} + 2\,\bar{4} + \bar{1}\,2 + 1\,\bar{2}\,4$$
$$\quad\quad = (\bar{1}+2)\bar{4} + \bar{1}\,2 + 1\,\bar{2}\,4$$
$$MUE = \bar{1}\,2 + \bar{1}\,\bar{4}$$
$$\quad\quad = \bar{1}(2+\bar{4})$$
$$MUF = \bar{2}\,4 + \bar{1}\,\bar{2} + 8 + \bar{1}\,4$$
$$\quad\quad = \bar{1}(\bar{2}+4) + \bar{2}\,4 + 8$$
$$MUG = (\bar{1}+\bar{2}+\bar{4})(2+4+8)$$

FIG. 7 illustrates the mechanization of the logic equations for MUA and MUG. Although the electroluminescent elements in FIGS. 2 and 3 are illustrated as single blocks, in practice, for ease of conversion to display logic and for convenient use of available voltages, each block will contain either four electroluminescent diodes in series or two parallel strings of four diodes each, depending upon whether more than four diodes are needed in the conversion logic for the particular stage. The unused diodes can be allowed to radiate with no associated photosensitive element.

As stated above $MUA = 14 + \bar{1}\bar{4} + 8 + 2$. In FIG. 7 this conversion is illustrated in the circuit controlling electroluminescent display element MUA. The MUA circuit contains photosensitive resistors 90–95. Referring to resistor 94, for example, when electroluminescent diode means $8m$ radiates light, adjacent photosensitive resistor 94 is caused to conduct, thereby lighting display element MUA. The Boolean equation for MUA indicates that MUA should conduct when stage 8 is on. When diodes $1m$ and $4m$ are both lighted, resistors 90 and 91 both conduct, thereby lighting MUA. The equation indicates that MUA should conduct for condition 14 (which could be written as $1\cdot4$ or as 1 AND 4), that is when stages 1 and 4 are both on. Similar logic functions occur when $\bar{1}$ and $\bar{4}$ are both on or when 2 is on.

Referring now to element MUG, where $$MUG = (\bar{1}+\bar{2}+\bar{4})(2+4+8)$$

element MUG must be on only when at least one of stages $\bar{1}$, $\bar{2}$ and $\bar{4}$ is on at the same time that at least one of stages 2, 4 and 8 is on. The MUG control circuit is arranged so that this condition is met.

The remaining equations can be used as the basis for construction of the remaining circuits without difficulty.

FIG. 8 illustrates the preferred construction of the logic conversion system for element MUA. The timepiece is best constructed using microelectronics and solid state or integrated circuits. Display element MUA is shown as consisting of four electroluminescent diode elements. Although more or fewer elements could be used, this number provides a convenient division of the voltage from a 6 volt battery supply. Photosensitive resistor elements 90–95 are illustrated in a logic and display layer of the solid state circuit.

Figure 1:
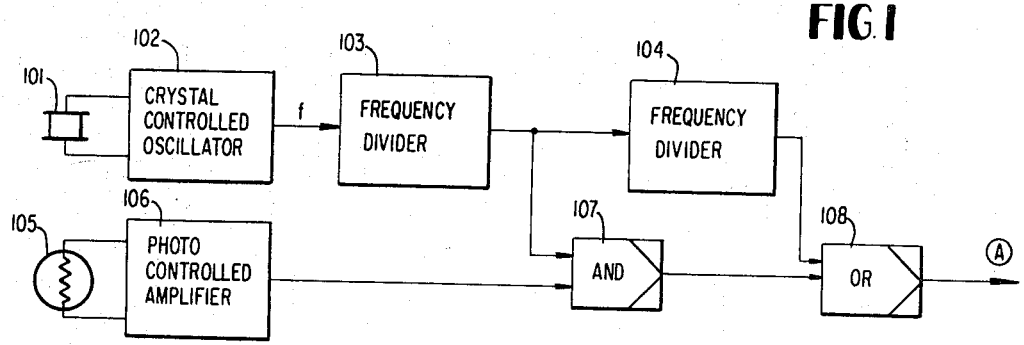
FIG. 1 is an illustration of the circuit for producing a one-pulse-per-minute timing signal and for varying this timing signal to reset the time display.

A layer of electroluminescent diodes is situated below and adjacent to the logic and display layer. The elements in the diode layer are distinguishable by the shading of the diode layer. The diodes illustrated are numbered $2m$, $8m$, $\bar{1}m$, $\bar{4}m$, $1m$ and $4m$ to correspond to the diodes illustrated in FIG. 7. The connections to the logic-activating diodes are not illustrated in FIG. 8. A timing circuit controlling these diodes as in FIGS. 1, 2, and 3, is located in the same layer as the electroluminescent diodes, but is not illustrated in FIG. 8.

FIG. 9 is a Veitch diagram illustrating the logic needed to convert the timer indications to display coding for tens of minutes. As was done for FIG. 6 for units coding, the following equations can be derived for tens coding from the Veitch diagrams:

$$MTA = (1+\bar{4})(\bar{1}+2+4)$$
$$MTB = \bar{1}+\bar{4}$$
$$MTC = \bar{2}+1$$
$$MTD = (1+\bar{4})(\bar{1}+2+4)$$
$$MTE = \bar{1}\,\bar{4}$$
$$MTF = \bar{1}\,\bar{2}+4$$
$$MTG = 2+4$$

Using these Boolean logic equations, circuits for controlling MT display, similar to those for MU display shown in FIG. 7, can be easily constructed.

The HT display is controlled in accordance with the equation:

$$HT = 10$$

FIG. 1 also illustrates the means for setting the time of the timepiece. The entire timepiece is designed to be hermetically sealed and compactly constructed with only the battery outside the hermetic seal. If the timepiece must be set to the correct time, it is necessary to speed up the count. This speed-up can be accomplished by replacing the one pulse per minute of signal A as derived from frequency divider 104 by a faster pulse repetition rate, as derived from frequency divider 103, until the time display is accurate.

If for example, oscillator 102 is timed for a frequency of 34.95253 kilohertz, frequency divider 103 can divide by $2^{15}$ and frequency divider 104 can divide by $2^6$ to give a normal output A of one pulse per minute. If the outputs of divider 103 are substituted for that of 104, the pulses are speeded up to $2^6$ pulses per minute or about 1.067 pulses per second.

The substitution of the faster count is accomplished by shining a concentrated, intense light beam through a transparent section of the hermetic seal onto a photoconductive element 105 which controls an amplifier 106. Amplifier 106 generates a D.C. signal which is applied to an AND gate 107 which passes the higher frequency signal from the divider 103 to an OR gate 108. Any input of OR gate 108 is passed out as signal A.

If desired, display of seconds can be provided by dividing initially to one pulse per second rather than one pulse per minute, inserting between the elements of FIG. 1 and FIG. 2 an additional counter similar to FIG. 2, and making the necessary alteration in the display and display logic.

Many more examples of the application of the present invention will suggest themselves to those skilled in the art. Alternative methods of accomplishing the invention may suggest themselves to those skilled in the art. Accordingly, the scope of the present application is only limited to the extent of the claims which follow.

What is claimed is:

1. In an electronic timepiece having means for producing a timing pulse signal, and counter means responsive to the cumulative total number of pulses received in said timing pulse signal for producing a plurality of binary signals, the improvement comprising:
 (a) first light-emitting means having a plurality of first light-emitting elements, at least one of said first light-emitting elements being controlled by each of said binary signals,
 (b) a plurality of arrays of light-emitting display elements for displaying the time, and
 (c) light-sensitive binarylogic means responsive to said first light-emitting elements for controlling each of said light-emitting display elements.

2. The electronic timepiece of claim 1 wherein:
 (a) said counter means comprises a chain of two-stage bistable electronic devices each producing a pair of said binary signals, one of said pair being produced by each of said two stages, and
 (b) said plurality of first light-emitting elements being arranged to have at least one of said plurality of first light-emitting elements individually controlled by each of said binary signals.

References Cited

UNITED STATES PATENTS 3,118,274   1/1964   Takeda et al. _____ 58—26

STEPHEN J. TOMSKY, Primary Examiner

E. C. SIMMONS, Assistant Examiner

U.S. Cl. X.R.

58—23, 26